(12) United States Patent
Fefer et al.

(10) Patent No.: US 6,410,488 B1
(45) Date of Patent: Jun. 25, 2002

(54) DRILLING FLUID

(75) Inventors: Michael Fefer, Whitby; Lorne Pierson, Calgary, both of (CA)

(73) Assignee: Petro-Canada, Mississauga (CA)

( * ) Notice: Subject to any disclaimer, the term of this patent is extended or adjusted under 35 U.S.C. 154(b) by 0 days.

(21) Appl. No.: 09/523,519

(22) Filed: Mar. 10, 2000

Related U.S. Application Data

(60) Provisional application No. 60/123,871, filed on Mar. 11, 1999.

(51) Int. Cl.$^7$ ............................. C09K 7/02; C09K 7/06
(52) U.S. Cl. ...................... 507/103; 507/203; 507/904
(58) Field of Search ................... 507/103, 203, 507/904; 585/264; 208/14

(56) References Cited

U.S. PATENT DOCUMENTS

| | | | |
|---|---|---|---|
| 4,464,269 A | | 8/1984 | Walker et al. |
| 4,787,990 A | | 11/1988 | Boyd |
| 4,876,017 A | | 10/1989 | Trahan et al. |
| 4,992,159 A | * | 2/1991 | Cody et al. .................... 208/89 |
| 5,045,219 A | | 9/1991 | Trahan et al. |
| 5,096,883 A | | 3/1992 | Mercer et al. |
| 5,189,012 A | | 2/1993 | Patel et al. |
| 5,333,698 A | | 8/1994 | Van Slyke |
| 5,432,152 A | | 7/1995 | Dawson et al. |
| 5,498,596 A | | 3/1996 | Ashjian et al. |
| 5,569,642 A | | 10/1996 | Lin |
| 5,589,442 A | | 12/1996 | Gee et al. |
| 5,605,879 A | | 2/1997 | Halliday et al. |
| 5,635,457 A | | 6/1997 | Van Slyke |
| 5,837,655 A | | 11/1998 | Halliday et al. |
| 5,846,913 A | | 12/1998 | Sawdon |
| RE36,066 E | | 1/1999 | Mueller et al. |
| 5,906,727 A | * | 5/1999 | Wittenbrink .................. 208/14 |
| 5,958,845 A | | 9/1999 | Van Slyke |
| 6,096,690 A | * | 8/2000 | Wittenbrink ................. 507/103 |
| 6,096,940 A | * | 8/2000 | Wittenbrink ................. 585/264 |
| 6,103,101 A | * | 8/2000 | Fragelli et al. ................ 208/89 |

* cited by examiner

*Primary Examiner*—Philip Tucker
(74) *Attorney, Agent, or Firm*—Bereskin & Parr; Philip C. Mendes da Costa

(57) ABSTRACT

A fluid suitable for use as the continuous phase in a drilling fluid is disclosed. The fluid is prepared by the sequential hydrotreating, hydroisomerization and hydrogenation of a crude oil feedstock. The fluid has good low temperature properties, including pour point and accordingly is useable in cold environments. A method of producing the fluid is also disclosed. The fluid may also be used as an additive to a drilling fluid having a continuous aqueous phase wherein it may act as, for example, a rate of penetration enhancer or a spotting fluid. The fluid may also be used as an additive to known drilling fluids such as internal olefins.

41 Claims, No Drawings

DRILLING FLUID

This application claims domestic priority from application Ser. No. 60/123,871, filed Mar. 11, 1999.

FIELD OF THE INVENTION

This invention relates to the field of drilling fluids. In one embodiment, the invention relates to a drilling fluid having oil as a continuous phase. In another embodiment, this invention relates to a rate of penetration enhancer comprising a continuous aqueous phase having a fluid dispersed therein, or a spotting fluid.

BACKGROUND OF THE INVENTION

Drilling fluids used for offshore or on-shore applications need to exhibit acceptable biodegradability, human, eco-toxicity, eco-accumulation and lack of visual sheen credentials for them to be considered as candidate fluids for the manufacturer of drilling fluids. In addition, appropriate fluids used in the drilling arena need to possess acceptable physical attributes. These generally include viscosities of less than 4.0 cSt@ 40° C., flash values of 100° C. (Cleveland Closed Cup) and, for cold weather applications, pour points of −40° C. or lower. These properties have typically been only attainable through the use of expensive synthetic fluids such as hydrogenated poly alpha olefins, as well as unsaturated internal olefins and linear alpha-olefins and esters.

Drilling fluids may be classified as either water-based or oil-based, depending upon whether the continuous phase of the fluid is mainly oil or mainly water. At the same time, water-based fluids may contain oil and oil-based fluids may contain water.

Water-based fluids conventionally include a hydratable clay, suspended in water with the aid of suitable surfactants, emulsifiers and other additives including salts, pH control agents and weighting agents such a barite. Water constitutes the continuous phase of the formulated fluid and is usually present in an amount of at least 50 percent of the entire composition; minor amounts of oil are sometimes added to enhance lubricity.

Oil-based fluids have a hydrocarbon fluid as the continuous phase and include other components such as clays to alter the viscosity, and emulsifiers, gellants, weighting agents and other additives. Water may be present in greater or lesser amounts but will usually not be greater than 50 percent of the entire composition; if more than about 10 percent water is present, the fluid is often referred to as an invert emulsion, i.e a water-in-oil emulsion. In invert emulsion fluids, the amount of water is typically up to about 40 weight percent based on the drilling fluid, with the oil and the additives making up the remainder of the fluid.

Oil-based fluids may be formulated from various hydrocarbon fluids such as synthetically derived poly alpha olefins, internal olefins, esters, low toxicity mineral oils or even diesel oil. Diesel and even low toxicity mineral oils are undesirable since they are toxic to marine life. As a result, the discharge of drilling fluids containing these oils into marine waters is usually strictly controlled because of the serious effects which the oil components may have on marine organisms. For this reason, offshore drilling rigs either use synthetic oil based fluids for drilling, or return the oil-based fluids to shore after they have been used. Synthetic fluids have the disadvantage of being very expensive.

Oil-based fluids may be made environmentally acceptable by the use of oils which posses inherently low toxicity to marine organisms and good biodegradability. Generally, these properties are associated in hydrocarbons with low aromaticity. For these reasons, drilling fluids based on linear paraffins might be considered desirable. On the other hand, however, linear paraffins tend to have high pour points. Further, higher molecular weight fractions of linear paraffins tend to be waxy so that in the low temperature environments frequently encountered in offshore drilling, there is a significant risk that waxy paraffin deposits will be formed in the downhole equipment or in the riser connecting the sea bed to the drilling equipment. In either event, this is unacceptable so that paraffinic oils have not achieved any significant utility as the base fluid in oil based fluids.

Furthermore, several jurisdictions in Europe and North America have either banned the discharge of all drilling cuttings (including drilling fluids) or legislated the reduction of the level of oil-on-cuttings that may be discharged. In light of this, drillers have started to re-inject the oil laced cuttings back into the geological formations. Because of the possibility of accidental spillage in these situations, there is a reluctance to use inexpensive diesel or low toxicity mineral oil based fluids. At the same time, there is a reluctance to use expensive synthetics oil based fluids. Consequently there is a need for an inexpensive environmentally acceptable drilling fluid, which has good environmental credentials and physical properties.

U.S. Pat. No. 5,189,012 to Patel et al. discloses a drilling fluid having synthetic branched chain oligomers synthesized from one or more olefins having a chain length of two to fourteen carbon atoms. The oligomers have an average molecular weight of from 120 to 1000. The synthetic hydrocarbon mixture possesses a viscosity of from 1.0 to 6.0 centistokes, preferably a viscosity of from 1.5 to 3.5 centistokes. The synthetic hydrocarbons may be hydrogenated (saturated), partially hydrogenated or non-hydrogenated.

U.S. Pat. No. 5,589,442 to Gee et al. discloses a drilling fluid composed of "mostly linear" olefins, that is, non-branched olefins with at least one double carbon-carbon bond present in the chain. The chain length of the olefins is at least twelve carbon atoms. The fluid contains substantial amounts of internal olefins, and small amounts of branched olefins.

U.S. Pat. No. 5,432,152 to Dawson et al. discloses an invert drilling fluid which comprises a water-in-oil emulsion which includes at least 50 volume percent of a low toxicity base oil, an emulsifier, and at least one solid additive suspended in the drilling fluid. At least about 25 volume percent of the base oil content of the drilling fluid is one or more linear alpha-olefins which have from about 14 to 30 carbon atoms.

U.S. Pat. No. 5,045,219 to Trahan et al. discloses a polyalphaolefin based downhole lubricant and spotting fluid used as an additive in water-based drilling. The polyalphaolefin contains no more than 0.5% of 1-decene monomer, blended in a concentration range of at least 5% by volume with emulsifiers.

Mercer et al. (U.S. Pat. No. 5,096,883) discloses a synthetic based drilling fluid made from synthetic branched-chain paraffins that may or may not contain ester functionalities. The base-oil has between about 16 and about 40 atoms per molecule. Preferably, the branched-chain paraffin used as the base-oil consists essentially of the dimer of 1-decene, which has a viscosity of about 5 centistokes at 40° C.

Trahan et al. (U.S. Pat. No. 4,876,017) discloses a synthetic hydrocarbon compound, such as a polyalphaolefin, which may be combined with emulsifiers and thinners. The polyalphaolefin may be used as a downhole lubricant in water based fluids. The fluids are non-toxic. The polyalphaolefin may be used at higher ratios to functional additives, to function as a spotting fluid for the removal of lodged tools downhole.

U.S. Pat. No. 5,837,655 to Halliday et al. discloses non-toxic, biodegradable purified paraffins that may be used as lubricants, rate of penetration enhancers, and/or spotting fluids for water-based drilling fluids. The paraffin component may be cycloparaffins having between about 8–28 carbon atoms, preferably between about 8–16 carbon atoms, straight or branched hydrocarbons having between 8 and 28 carbon atoms, or mixtures of the two. Examples include white oils and other technical or food grade paraffins. The white oils and food grade paraffins are manufactured through conventional means such as hyrotreating or through separation technologies. They have conventional pour points of, for example, −18° C.

U.S. Pat. No. 5,605,879 to Halliday et al. discloses the use of olefin isomers, which are added to water-based drilling fluids, for downhole lubricants, rate of penetration enhancers, and/or spotting fluids. The additives may be used to prevent a drill bit from sticking in a formation, enhance the penetration of a drill bit through a formation, or free a drill bit when it becomes lodged in a formation during drilling. The olefin isomers may be compounds having the formula $C_nH_{2[(n-x)+1]}$, where n is between about 8 and about 30; x is the number of carbon-carbon double bonds in the isomer and is between about 1 and about (n/2).

Van Slyke (U.S. Pat. No. 5,958,845) discloses a non-toxic, synthetic fluid for use in drilling fluids. The synthetic fluid may be at least about 95 weight percent hydrocarbons containing 11 or more carbon atoms, greater than 5 weight percent hydrocarbons containing 18 or more carbon atoms, at least about 50 weight percent isoparaffins, at least about 90 weight percent total paraffins, at least 2 hydrocarbons containing a consecutive number of carbon atoms, less than about 1 weight percent naphthenics, and less than 0.1 volume percent aromatics. Alternately, the synthetic fluid has at least about 95 weight percent hydrocarbons containing 10 or more carbon atoms and at least about 90 weight percent n-paraffins.

U.S. Pat. No. 5,846,913 to Sawdon discloses a biodegradable wellbore fluid. The fluid has a continuous oil phase containing a dispersed hydrophilic liquid. The continuous oil phase has at least 50 percent by weight of an n-alkane having from 10 to 20 carbon atoms, or mixture of n-alkanes having from 10 to 20 carbon atoms. The continuous oil phase is substantially free of cycloparaffins, isoparaffins, and aromatic compounds, and not greater than 20 percent by volume of polyalphaolefin.

Lin (U.S. Pat. No. 5,569,642) discloses an invert drilling fluid (oil in water emulsion) based on synthetic hydrocarbons. The fluid has at least 50 volume percent of a low toxicity base oil, and at least one additive such as an emulsifier, viscosifier, or weighing agent. At least 25 weight percent of the base oil is content of the drilling fluid is a mixture of a linear alkane and a branched alkane which may be prepared from olefinic monomers. The olefinic monomers have carbon chain lengths from six to twenty, and have at least one polymerizible double bond.

U.S. Pat. No. 5,498,596 to Ashjian et al. discloses well fluids which are formulated with a hydrocarbon oil blend of a low viscosity polyalpha-olefin (PAO) such as a low molecular weight oligomer of decene together with a $C_{10}$ to $C_{18}$ paraffinic hydrocarbon from petroleum and a $C_{10}$ to $C_{18}$ olefin such as dodecene-1 or tetradecene-1.

Van Slyke (U.S. Pat. No. 5,333,698) discloses a wellbore fluid based on a white mineral oil. The white mineral oil has at least 95 weight percent of compounds containing 14 or more carbon atoms. The white mineral oil has an n-paraffinic content of at least 5.25 weight percent, and a total paraffinic content of 25 weight percent. The total naphthenic content of the white mineral oil is between about 30 and about 75 weight percent.

U.S. Pat. No. 4,787,990 to Boyd discloses a low toxicity oil for use in drilling fluids. The oil consists essentially of branched- and cyclic-paraffins having 11 to 17 carbon atoms per molecule, and has a low aromatic content of less than about 1%, and a low n-paraffin content (less than about 5%).

SUMMARY OF THE INVENTION

It has now been discovered that is possible to formulate paraffin based drilling fluids for off-shore and ecologically sensitive on-shore applications (eg. where the water table is close to the surface) with fluids made through sequential hydrocracking, hydroisomerization and hydrogenation reactions. The fluids produced as a result of this reaction sequence (sometimes referred to herein as HHH Fluids) may be used as a drilling fluid wherein the HHH Fluid itself is the continuous phase. The drilling fluid may also include standard additives, which are common in the industry for drilling fluids. In addition, the HHH Fluids may be mixed together with synthetic fluids to reduce the cost of the latter without compromising performance, ecotoxicity or biodegradability.

One advantage of the HHH Fluids produced according to this invention is that they possess high levels of isomerized paraffins and therefore exhibit good biodegradability and low toxicity. Further, they have low pour points (eg. less than about −45° C., preferably less than about −55° C., and more preferably less than about −60° C.). Their viscosity does not increase rapidly with decreasing temperature and therefore they disperse more rapidly in cold water conditions endemic to deep sea and northern climates. Therefore, drilling fluids based on the present invention typically do not need to be stored in heated areas, even in cold weather climates.

A further advantage of the instant invention is that their manufacture is significantly simpler than that of synthetic fluids that are traditionally used in the field and are therefore less expensive.

In accordance with the instant invention, the HHH Fluids may also be used as a constituent element of a drilling fluid having a continuous aqueous phase, and the HHH Fluid is dispersed in the aqueous phase. Examples of such drilling fluids include rate of penetration enhancers and spotting fluids.

DESCRIPTION OF PREFERRED EMBODIMENT

According to the present invention, drilling fluids are formulated with a hydrocarbon oil component. The hydrocarbon is produced by the sequential hydrocracking-hydroisomerization-hydrogenation of a crude oil. The fluid produced by the sequential hydrocracked-hydroisomerized-hydrogenated oil (HHH Fluid) may be a mixture of one or more hydrocracked-hydroisomerized- hydrogenated components having a chain length of about 10 to about 40 carbon atoms, and may include isomerized paraffins, which may be branched non cyclic paraffins or cyclic paraffins with branched alkyl side chains. Preferably, the HHH Fluid is a mixture of one or more $C_{10}$ to $C_{20}$ isomerized-paraffins. Most preferably, the HHH Fluid is a mixture of one or $C_{10}$–$C_{18}$ isomerized paraffins. The HHH Fluid preferably has a viscosity of about 1 to about 4 cSt@40° C. (ASTM D-445) and a flash point (ASTM D-93) of preferably at least 70° C., more preferably at least 100° C., and most preferably at least 120° C. Preferably, the pour point should be less than about –40 ° C. (ASTM D-97), and more preferably it should be less than about –50° C. The density of the oil is preferably in the range of about 0.76 to about 0.86 kg/L at 15° C. (ASTM-D-1298).

The HHH Fluid of the present invention is preferably substantially free of aromatic compounds. More preferably, the HHH Fluid contains less than about 0.1 weight percent aromatic compounds. Most preferably, the HHH Fluid contains less than about 0.01 weight percent aromatic compounds. The HHH Fluid may be a mixture of one or more isomerized paraffins having between about 10 and about 40 carbon. Preferably, the HHH Fluid is a mixture of one or more isomerized paraffins having between about 10 and about 20 carbon atoms. It will be appreciated by those skilled in the art that the exact number of carbon atoms in the HHH Fluid may be varied depending on the desired viscometrics of the drilling fluid.

The HHH Fluid of the instant invention may be obtained by atmospheric and vacuum distillation of a feedstock that is a crude oil. Preferably, the fractions that are selected for the feedstock of the process are those that are rich in linear molecules such as waxy vacuum gas fluid fractions, wax fractions as well as heavier hydrocracker bottom fractions.

The feedstock is first subjected to a hydrotreating or hydrocracking (herein referred to as hydrotreating) step. While hydrotreating processing conditions are known to those skilled in the art, in general terms, the feedstock is exposed to a catalyst at elevated pressure and temperature conditions to obtain a hydrotreated product. The hydrotreating catalyst may be a sulphur and nitrogen resistant catalyst, which is based on sulphided group VIB and/or VIIIB metals. Examples of such catalysts include Ni/W or Co/Mo on an alumina or crystalline alumino silicate carrier. The hydrotreating may be conducted at a temperature from about 200 to 450° C., at a pressure from about 400 to about 4,000 psig and a space velocity of from about 0.1 to about 20 $hr^{-1}$. The processing conditions are preferably adjusted such that the levels of sulphur and nitrogen molecules are reduced to a level where they will not act as poison in the subsequent hydroisomerization reaction. Preferably, the hydrotreated product is free or at least essentially free of any sulphur and nitrogen molecules.

The hydrotreated product is then hydroisomerized. During the hydroisomerization step, the linear or normal paraffin sections of the molecules undergo branching with a resulting decrease in pour point. Hydroisomerization processing conditions are known to those persons skilled in the art. In general terms, the hydroisomerization reaction may be carried out in conditions ranging from about 250 to about 450° C., at pressures from about 100 to about 5,000 psig, a hydrogen circulation rate of about 400 to about 15,000 SCF/B and liquid hourly space velocity of 0.1 $hr^{-1}$ to 20 $hr^{-1}$. The hydroisomerization reaction is conducted in the presence of the catalyst. Preferably, the catalyst is a noble metal catalyst. For example, the catalyst may be using a crystalline silicoaluminophosphate molecular sieve catalyst which optionally contains group VIIIB and IIA metals such as platinum or palladium.

The resultant hydroisomerized product is then subjected to a hydrogenation step to eliminate any unstable molecules (for example olefins) produced during the hydroisomerization step. Hydrogenation procedures are well known in the art. Typically, the hydrogenation is carried out in the presence of the catalyst and may be conducted at a temperature from about 200 to about 350° C., a pressure from about 400 to about 5,000 psig, and a hydrogen circulation rate between about 400 SCF/B and about 15,000 SCF/B. The catalyst may be a noble metal catalyst and/or a catalyst based upon sulphided group VIB or VIIIB metals. Preferably the hydrogenation is conducted in the presence of a solid metal hydrogenation catalyst such as Ni, Pt or Pd on an alumina support.

The hydrogenated product is fractionated, such as using a vacuum or atmospheric distillation column, to produce a narrow cut (from about $C_{10}$ to about $C_{40}$, preferably from about $C_{10}$ to about $C_{20}$ and most preferably from about $C_{12}$ to about $C_{18}$) as the HHH Fluid.

Through the choice of feedstock and processing conditions, the composition of the fluids made by the sequential hydrocracking, hydroisomerization and hydrogenation of the feedstock is controlled to yield products which have improved biodegradability, toxicology and dispersive properties. Fluids obtained through the sequential steps set out herein have improved properties over those known in the trade and are easier to manufacture.

The HHH Fluid may be used as a drilling fluid by itself, or in conjunction with other standard additives such as clays, emulsifiers, gellants, and weighting agents. Typically, these additives comprise between about 0 and about 30 volume percent of the drilling fluid.

Alternately, the HHH Fluid may be used as a rate of penetration enhancer in drilling fluids having a continuous aqueous phase. In this situation, the HHH Fluid comprises between about 1 and about 15 volume percent of the drilling fluid, and preferably, between about 1 and about 2 volume percent. The remainder of the drilling fluid is made from water and other standard additives known in the art.

Additionally, the HHH Fluid may be used as a spotting fluid to help dislodge downhole drill bits. In this situation, the spotting fluid comprises between about 50 and about 90 volume percent of the HHH Fluid, and about 10 to about 50 volume percent of additives such as emulsifiers, viscosifiers, surfactants and brine.

The HHH Fluids may also be used as an additive to internal or linear olefins (for example $C_{12}$–$C_{18}$ internal or linear olefins of low viscosity that makes the linear or internal olefin suitable as a formulation for use in drilling fluids. It is known in the art to use internal or linear olefins as drilling fluids (for example see U.S. Pat. No. 5,589,442 to Gee et al., discussed above). However, these fluids are very expensive to manufacture, particularly compared to the manufacture of the HHH Fluids of the present invention. The addition of the HHH Fluid to internal olefins, decreases the cost of the resulting drilling fluid, and maintains or decreases the toxicity of the resulting drilling fluid.

The internal or linear olefins preferably include one or more olefins having a between 12 and 18 carbon atoms. More preferably, the olefins are a blend of olefins having between 16 and 18 carbons atoms. The amount of the olefin component in the hydrocarbon blend is preferably in the range of about 5 to about 75 volume percent of the blend. More preferably, it is from about 10 to about 70 volume percent of the blend. Most preferably, the olefin is from about 40 to about 60 volume percent of the blend.

EXAMPLE 1

Two drilling fluids were obtained by subjecting a feedstock to sequential hydrotreating, hydroisomerization and hydrogenation steps. The resultant fluids were tested to determine various properties. The properties and the test method are set out in Table 1:

TABLE 1

| Test | Method | Sample 1 | Sample 2 |
|---|---|---|---|
| Color | ASTM D1500 | <0.5 | <0.5 |
| Color | Visual | Water White | Water White |
| Odor |  | None | None |
| Viscosity @ 40° C., cSt | ASTM D445 | 3.95 | 2.74 |
| Viscosity @ 100° C., cSt | ASTM D445 | 1.44 | 1.13 |
| Density, 15° C., kg/L | ASTM 4052 | 0.828 |  |
| Pour Point, ° C. | ASTM D97 | <−51 | <−51 |
| Flash Point, ° C. | ASTM D92 | 130 | 103 |
| Saturates, wt % | PCM 528 | 100 | 100 |
| Paraffins, wt % | PCM 528 | 100 | 100 |
| Aromatics, wt % | PCM 528 | 0 | 0 |
| Carbon Distribution | ASTM D2887 | $C_{12}$–$C_{20}$ | $C_{10}$–$C_{18}$ |

As can be seen from the foregoing table, the drilling fluid according to the instant invention had an aromatics level below 0.001 wt %, and a pour point of less than −51° C. Accordingly, such fluids are highly beneficial for use in cold environments where conventional fluids tend to congeal as opposed to disbursing.

EXAMPLE 2

The fluid from Example 1, Sample 1 was subjected to a series of tests to determine its toxicity, biodegradability and pollution potential. The fluid was tested based upon standards used in North America as well as Europe. The results of the tests are set out in Table 2:

TABLE 3

| Component/Test | Sample 1 | Sample 2 |
|---|---|---|
| IA35, wt % (1) | 50 | 0 |
| $C_{16}$–$C_{18}$ IO, wt % (2) | 50 | 100 |
| Sediment Toxicity, LC50, ppm (3) | >5021 | 4098 |
| Solid Phase Biodegradability, % after 112 days (3) | 47 | 39 |

(1) IA35 ™ a hydroisomerized $C_{12}$–$C_{20}$ paraffin
(2) IO - Internal Olefin
(3) Sediment Toxicity and Solid Phase Biodegradability test protocols are described in 40 CFR 435, Vol 64, No 22, February 3, 1999

This example shows that the addition of an HHH Fluid component to an internal olefin reduces the toxicity and increases the biodegradability of the resultant drilling oil.

We claim:

1. A method for producing a drilling fluid having a hydrocarbon oil component as a continuous phase, the method comprising the steps of:
   (a) hydrotreating a crude oil feedstock to obtain a hydrotreated product;
   (b) hydroisomerizing the hydrotreated product to obtain a hydroisomerized product;
   (c) hydrogenating the hydroisomerized product to obtain the fluid; and,
   (d) adding at least one additive selected from the group of additives consisting of emulsifiers, gellants, weighting agents and clays.

2. The method as claimed in claim 1 wherein the hydroisomerizing step is carried out at a temperature from about

TABLE 2

| | Toxicity | Test | Protocol | Results | Accepted Criteria |
|---|---|---|---|---|---|
| Marine Fish | Juvenile Turbot, LC50 @ 96h, mg/l (Scophthelmus maximus) | European | PARCOM method 1995 | >1000 | >1000 |
| Fresh Water Fish | Rainbow Trout, LC50 @ 96h, mg/l (Oncorhynchus mykiss) | North American | ESP 1/RM/9 | >400,000 | |
| Fresh Water Daphnia | Daphnia Magna, LC50 @ 48h, mg/l | North American | ESP 1/RM/11 | Not Lethal | |
| Marine Alga | Marine Alga, EC50 @ 72h, mg/l (Skeletonema costatum) | European | ISO/DIS 10253 | >1000 | >1000 |
| Marine Copepod | Marine Copepod, EC50 @ 4Bh, mg/l (Acartia ionso) | European | ISO/TC147/SC5/W/G2 (ISO/CD 14669) Version 4 | >2000 | >2000 |
| Marine Amphipod | Sediment Re-Worker, LC50 @ 10 days, m (Corophium Volutator) | European | PARCOM1995 | 1812.2 | >1000 |
| Marine Invertebrate | Mysid Shrimp. LC50 @ 96h, mg/l (Musiopsis bahia) | North American | EPA/800/4-90-D27F | >500,000 | |
| Microtox Biodegradability | | North America | EPS 1/RM/24 | Pass | Pass |
| Aerobic Biodegradability after 28 days, % Pollution Potential | | European North American | Modified Slurm Test OECD 301B | 68.1 | 60 |
| Sheen Test | | North America | EPA protocol (Title 40 Chapter 1 Part 110) | Pass | Pass |

EXAMPLE 3

The solid phase biodegradeability and sediment toxicity of two samples of a blend of a hydroisomerized paraffin and a $C_{16}$–$C_{18}$ internal olefin were tested to determine whether they comply with US EPA requirements. The results are shown in Table 3:

250 to about 450° C., and a pressure of about 100 to about 5,000 psig, in the presence of a noble metal catalyst.

3. The method as claimed in claim 2 wherein the hydrotreating step is carried out at a temperature from about 200 to about 450° C. and a pressure of about 400 to about 4,000 psig, in the presence of a catalyst based on sulphided group VIB or VIIIB metals.

4. The method as claimed in claim 3 wherein the conditions of the hydrotreating step are adjusted to produce a hydrotreated product which is essentially free of sulphur and nitrogen molecules.

5. The method as claimed in claim 3 wherein the hydrogenating step is carried out at a temperature from about 200 to about 350° C., and a pressure of about 400 to about 5,000 psig, in the presence of a catalyst selected from the group consisting of noble metal catalysts and catalysts based on sulphided group VIB or VIIIB metals.

6. The method as claimed in claim 1 wherein the fluid obtained comprises a mixture of one or more hydrotreated, hydroisomerized, hydrogenated hydrocarbon oils having between about 10 and about 40 carbon atoms.

7. The method as claimed in claim 6 wherein the fluid obtained comprises a mixture of one or more hydrotreated, hydroisomerized, hydrogenated hydrocarbon oils having between about 12 and 18 carbon atoms.

8. The method as claimed in 1 wherein the crude oil comprises at least one crude oil fraction selected from the group consisting of waxy gas fluid fractions, wax fractions, and heavy hydrocracker bottom fractions.

9. A method for producing a rate of penetration enhancer, the method comprising the steps of:
   (a) hydrotreating a crude oil feedstock to obtain a hydrotreated product;
   (b) hydroisomerizing the hydrotreated product to obtain a hydroisomerized product;
   (c) hydrogenating the hydroisomerized product to obtain the rate of penetration enhancer; and,
   (d) adding the rate of penetration enhancer to an aqueous phase in an amount between about 1 and about 15 volume percent.

10. The method as claimed in claim 9 wherein the hydroisomerizing step is carried out at a temperature from about 250 to about 450° C., and a pressure of about 100 to about 5,000 psig, in the presence of a noble metal catalyst.

11. The method as claimed in claim 10 wherein the hydrotreating step is carried out at a temperature from about 200 to about 450° C. and a pressure of 400–4,000 psig, in the presence of a catalyst based on sulphided group VIB or VIIIB metals.

12. The method is claimed in claim 11 wherein the conditions of the hydrotreating step are adjusted to produce a hydroisomerized product which is essentially free of sulphur and nitrogen molecules.

13. The method as claimed in claim 11 wherein the hydrogenating step is carried out at a temperature from about 200 to about 350° C., a pressure of about 400 to about 5,000 psig and in the presence of a noble metal catalyst or a catalyst based on sulphided group VIB or VIIIB metals.

14. The method as claimed in claim 9 wherein the fluid obtained comprises a mixture of one or more hydrotreated, hydroisomerized, hydrogenated hydrocarbon oils having between about 10 and about 40 carbon atoms.

15. The method as claimed in claim 14 wherein the fluid obtained comprises a mixture of one or more hydrotreated, hydroisomerized, hydrogenated hydrocarbon oils having between about 12 and 18 carbon atoms.

16. The method as claimed in claim 9, wherein the rate of penetration enhancer is added to an aqueous phase in an amount between about 1 and about 2 volume percent.

17. The method as claimed in 9 wherein the crude oil comprises at least one crude oil fraction selected from the group consisting of waxy gas fluid fractions, wax fractions, and heavy hydrocracker bottom fractions.

18. A drilling fluid having a hydrocarbon oil as a continuous phase wherein the fluid is prepared by a process comprising:
   (a) hydrotreating a crude oil feedstock to obtain a hydrotreated product;
   (b) hydroisomerizing the hydrotreated product to obtain a hydroisomerized product;
   (c) hydrogenating the hydroisomerized product to obtain the fluid; and,
   (d) at least one additive selected from the group of additives consisting of emulsifiers, gellants, weighting agents and clays.

19. The drilling fluid as claimed in claim 18 wherein the hydroisomerizing step is carried out at a temperature from about 250 to about 450° C., and a pressure of about 100 to about 5,000 psig, in the presence of a noble metal catalyst.

20. The drilling fluid as claimed in claim 19 wherein the hydrotreating step is carried a temperature from about 200 to about 450° C. and a pressure of 400–4,000 psig, in the presence of a catalyst based on sulphided group VIB or VIIIB metals.

21. The drilling fluid as claimed in claim 20 wherein the conditions of the hydrotreating step are adjusted to produce a hydroisomerized product which is essentially free of sulphur and nitrogen molecules.

22. The drilling fluid as claimed in claim 20 wherein the hydrogenating step is carried out at a temperature from 200–350° C., and a pressure of about 400 to about 5,000 psig, in the presence of a noble metal catalyst or a catalyst based on sulphided group VIB or VIIIB metals.

23. The drilling fluid as claimed in claim 18 wherein the fluid obtained comprises a mixture of one or more hydrotreated, hydroisomerized, hydrogenated hydrocarbon oils having between about 10 and about 40 carbon atoms.

24. The drilling fluid as claimed in claim 23 wherein the fluid obtained comprises a mixture of one or more hydrotreated, hydroisomerized, hydrogenated hydrocarbon oils having between about 12 and 18 carbon atoms.

25. The drilling fluid as claimed in 18 wherein the crude oil comprises at least one crude oil fraction selected from the group consisting of waxy gas fluid fractions, wax fractions, and heavy hydrocracker bottom fractions.

26. A rate of penetration enhancer having a hydrocarbon oil dispersed in a continuous aqueous phase wherein the hydrocarbon oil component is prepared by a process comprising the steps of:
   (a) hydrotreating a crude oil fraction to obtain a hydrotreated product;
   (b) hydroisomerizing the hydrotreated product to obtain a hydroisomerized product; and,
   (c) hydrogenating the hydroisomerized product to obtain the fluid.

27. The rate of penetration enhancer as claimed in claim 26 wherein the hydroisomerizing step is carried out at a temperature from about 250 to about 450° C., and a pressure of about 100 to about 5,000 psig, in the presence of a noble metal catalyst.

28. The rate of penetration enhancer as claimed in claim 26 wherein the hydrotreating step is carried out at a temperature from about 200 to about 450° C. and a pressure of 400–4,000 psig, in the presence of a catalyst based on sulphided group VIB or VIIIB.

29. The rate of penetration enhancer as claimed in claim 27 wherein the conditions of the hydrotreating are adjusted to produce a hydroisomerized product which is essentially free of sulphur and nitrogen molecules.

30. The rate of penetration enhancer as claimed in claim 26, wherein the hydrogenation step is carried out at a temperature from about 200 to about 350° C., and a pressure of about 400 to about 5,000 psig, in the presence of a noble metal catalyst or a catalyst based on sulphided group VIB or VIIIB metals.

31. The rate of penetration enhancer as claimed in claim 26 wherein the fluid obtained comprises a mixture of one or more hydrotreated, hydroisomerized, hydrogenated hydrocarbon oils having between about 10 and about 40 carbon atoms.

32. The rate of penetration enhancer as claimed in claim 31 wherein the fluid obtained comprises a mixture of one or more hydrotreated, hydroisomerized, hydrogenated hydrocarbon oils having between about 12 and 18 carbon atoms.

33. The rate of penetration enhancer as claimed in 26 wherein the crude oil comprises at least one crude oil fraction selected from the group consisting of waxy gas fluid fractions, wax fractions, and heavy hydrocracker bottom fractions.

34. A spotting fluid having a hydrocarbon oil dispersed in a continuous aqueous phase wherein the hydrocarbon oil component is prepared by a process comprising the steps of:
(a) hydrotreating a crude oil fraction to obtain a hydrotreated product;
(b) hydroisomerizing the hydrotreated product to obtain a hydroisomerized product; and,
(c) hydrogenating the hydroisomerized product to obtain the fluid.

35. The spotting fluid as claimed in claim 34 wherein the hydroisomerizing step is carried out at a temperature from about 250 to about 450° C., and a pressure of about 100 to about 5,000 psig, in the presence of a noble metal catalyst.

36. The spotting fluid enhancer as claimed in claim 34 wherein the hydrotreating step is carried out at a temperature from about 200 to about 450° C. and a pressure of 400–4,000 psig, in the presence of a catalyst based on sulphided group VIB or VIIIB.

37. The spotting fluid as claimed in claim 36 wherein the conditions of the hydrotreating are adjusted to produce a hydroisomerized product which is essentially free of sulphur and nitrogen molecules.

38. The spotting fluid as claimed in claim 34, wherein the hydrogenation step is carried out at a temperature from about 200 to about 350° C., and a pressure of about 400 to about 5,000 psig, in the presence of a noble metal catalyst or a catalyst based on sulphided group VIB or VIIIB metals.

39. The spotting fluid as claimed in claim 34 wherein the fluid obtained comprises a mixture of one or more hydrotreated, hydroisomerized, hydrogenated hydrocarbon oils having between about 10 and about 40 carbon atoms.

40. The spotting fluid as claimed in claim 39 wherein the fluid obtained comprises a mixture of one or more hydrotreated, hydroisomerized, hydrogenated hydrocarbon oils having between about 12 and 18 carbon atoms.

41. The spotting fluid as claimed in claim 34 wherein the crude oil fraction comprises at least one crude oil fraction selected from the group consisting of waxy gas fluid fractions, wax fractions, and heavy hydrocracker bottom fractions.

\* \* \* \* \*